R. P. WITT.
PEANUT BLANCHING MACHINE.
APPLICATION FILED JULY 9, 1920.

1,388,394.

Patented Aug. 23, 1921.
3 SHEETS—SHEET 2.

WITNESSES:
R. E. Hamilton

INVENTOR.
Roscoe P. Witt
BY Warren D. House
His ATTORNEY.

R. P. WITT.
PEANUT BLANCHING MACHINE.
APPLICATION FILED JULY 9, 1920.
1,388,394.
Patented Aug. 23, 1921.
3 SHEETS—SHEET 3.
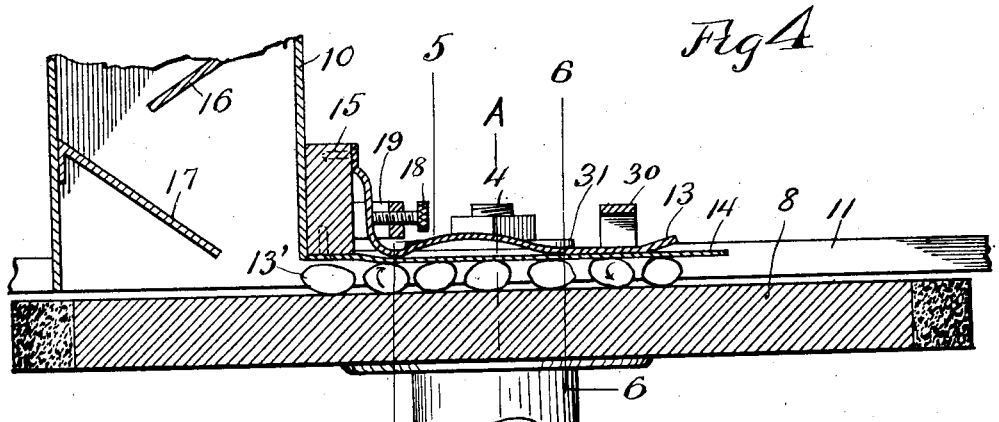
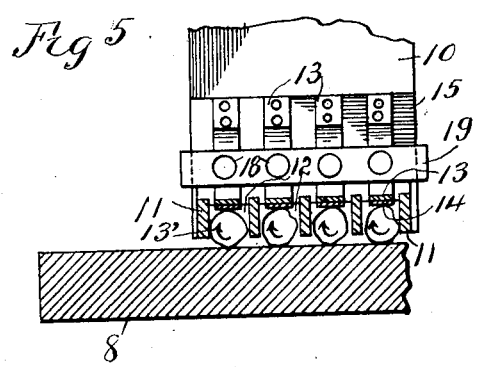
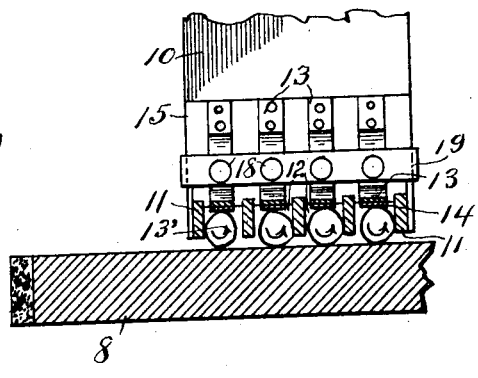
WITNESS
R. E. Hamilton
INVENTOR.
Roscoe P. Witt
BY
Warren D. House
His ATTORNEY.

UNITED STATES PATENT OFFICE.

ROSCOE P. WITT, OF KANSAS CITY, KANSAS, ASSIGNOR TO RIDENOUR-BAKER GROCERY COMPANY, OF KANSAS CITY, MISSOURI, A CORPORATION OF MISSOURI.

PEANUT-BLANCHING MACHINE.

1,388,394. Specification of Letters Patent. Patented Aug. 23, 1921.

Application filed July 9, 1920. Serial No. 394,874.

*To all whom it may concern:*

Be it known that I, ROSCOE P. WITT, a citizen of the United States, residing at Kansas City, in the county of Wyandotte and State of Kansas, have invented a certain new and useful Improvement in Peanut-Blanching Machines, of which the following is a specification.

My invention relates to improvements in peanut blanching machines. It relates particularly to blanching of the kernels of peanuts and the like.

The object of my invention is to provide a novel machine for blanching peanut kernels by removing the skins.

The novel features of my invention are hereinafter fully described and claimed.

In the accompanying drawings, which illustrate an apparatus for carrying my invention into effect, Figure 1 is a vertical sectional view, enlarged, on the line 1—1 of Fig. 3.

Fig. 4 is a vertical sectional view enlarged, on the line 4—4 of Fig. 2.

Fig. 5 is a vertical sectional view on the line 5—5 of Fig. 4.

Fig. 6 is a vertical sectional view on the line 6—6 of Fig. 4.

Similar reference characters designate similar parts in the different views.

Figure 1:
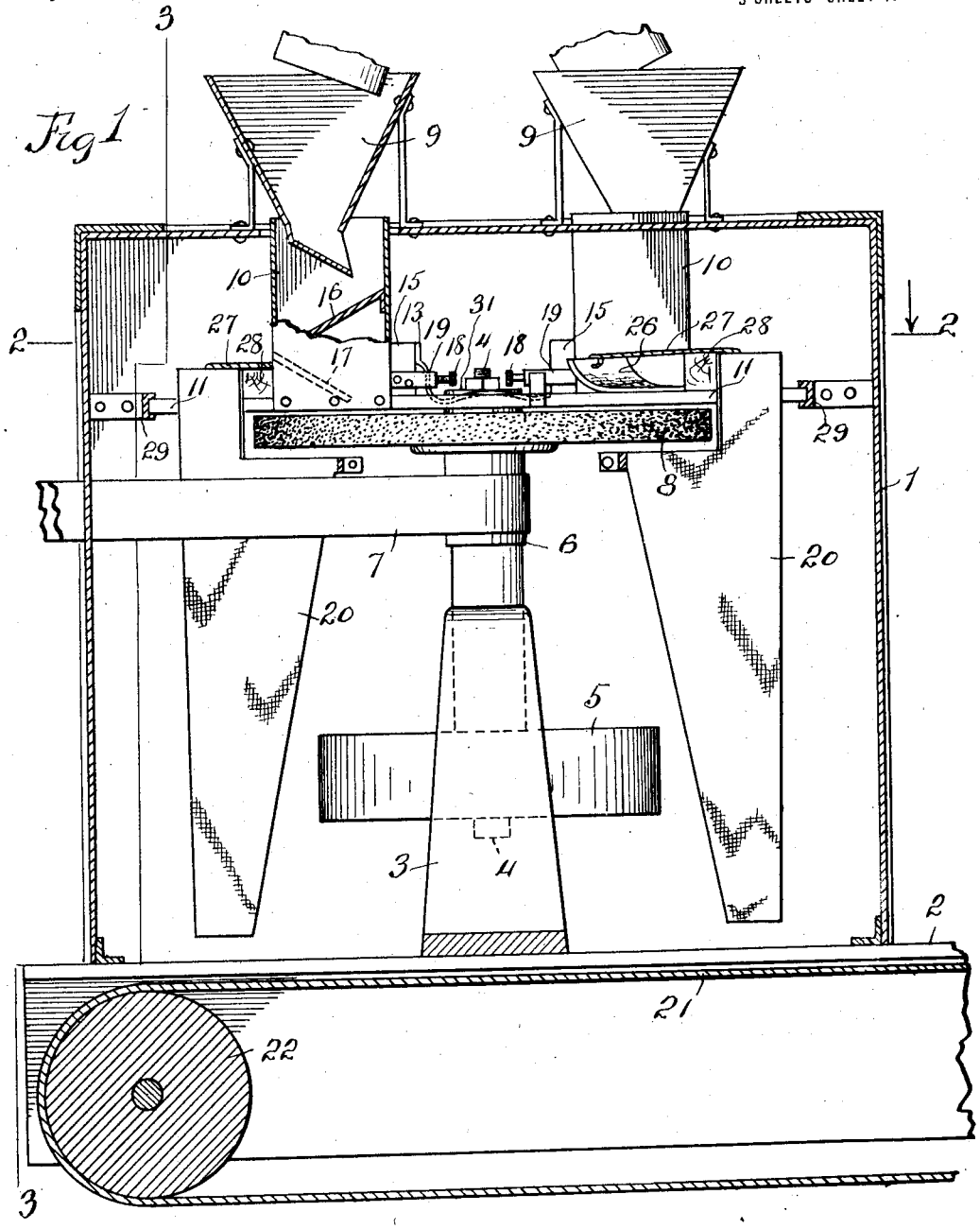

1 designates an inclosing casing provided with a supporting base 2 on which is mounted an inverted U-shaped supporting yoke 3 in which is rotatably mounted a vertical shaft 4 having secured to its lower end a fly wheel 5 and having secured to it a pulley 6 which is driven by a belt 7 which is connected with any suitable source of power, not shown.

Rigidly secured to the upper end of the shaft 4 is an abrading member comprising, preferably, a horizontally disposed circular corundum wheel 8 having, preferably a flat upper surface.

The kernels of the peanuts are fed tangentially across the upper surface of the abrading wheel 8, that is transversely across a radial line which is perpendicular to the direction of movement of the kernels.

9 designates two hoppers supported on the casing 1 at opposite sides respectively of the shaft 4. Each hopper feeds into a vertical container 10 which is supported upon longitudinal horizontal bars 11 which are spaced apart so as to provide channels 12, into which the kernels are dropped, by which they are guided tangentially across the upper surface of the abrading wheel 8. The kernels designated by 13' are free to rotate axially in the channels 12 between the bars 11. The kernels of each channel 12 are held against the wheel 8 by means of flat springs 13 which respectively bear against strips of canvas 14, the springs 13 and canvas strips 14 being attached at one set of ends to a block 15 secured to one vertical side of the adjacent container 10. The latter may be provided with inclined baffle plates 16 and 17.

18 designates horizontal set screws mounted in a U-shaped plate 19 which is attached to the block 15. The set screws bear respectively against the springs 13 in a manner such that by adjusting the set screws, the downward pressure of the springs 13 on the strips 14 may be varied.

Figure 2:
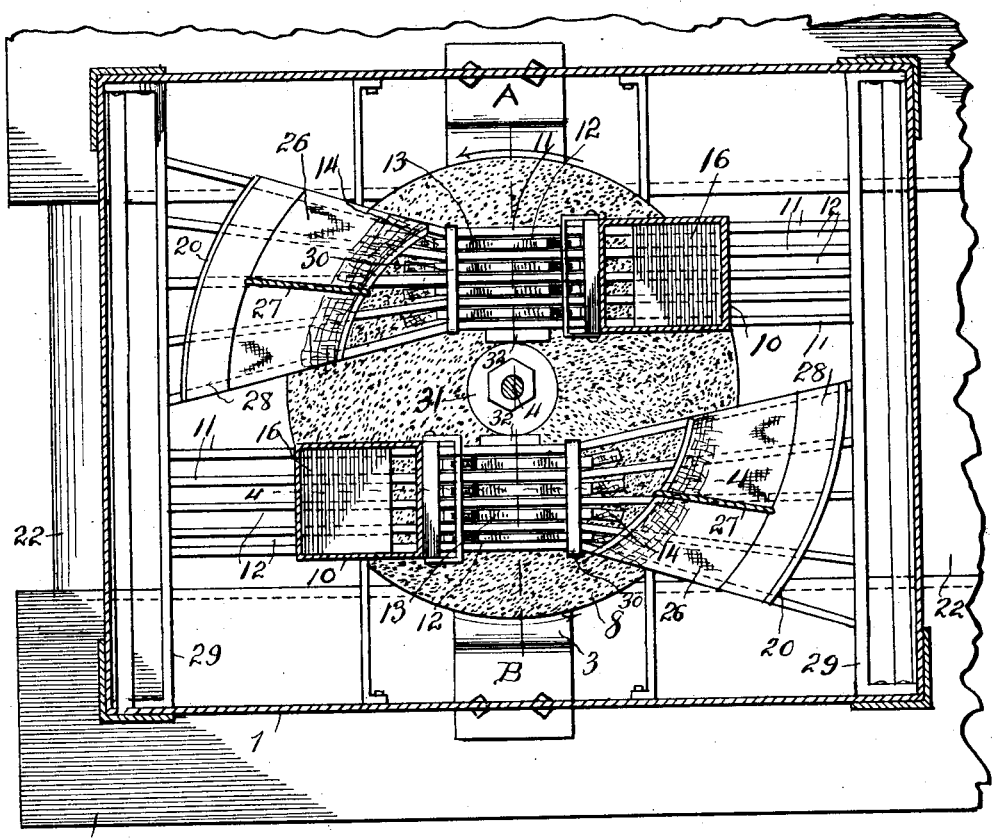
Fig. 2 is a horizontal sectional view on the line 2—2 of Fig. 1.
Figure 3:
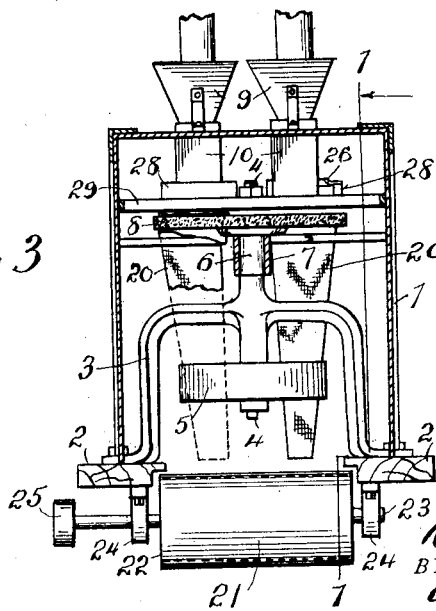
Fig. 3 is a vertical sectional view, reduced, on the line 3—3 of Fig. 1.

The two hoppers 9 are disposed at opposite sides of a vertical plane which extends diametrically through the center of the wheel 8 and perpendicular to the guide bars 11. This diametrical plane is designated by A—B in the drawings, Figs. 2 and 4. The kernels 13' travel in a right line across the plane A—B, while in contact with the wheel 8. The kernels will thus travel in a direction substantially at right angles to and across the radial line A—B. Before the kernels cross the line A—B, the revolving wheel will cause the kernels to be rotated axially clockwise, as viewed in Fig. 5, that is when the wheel 8 is rotating counter-clockwise, as viewed in Fig. 2. After the kernels cross the line A—B, the revolving wheel 8 will cause the kernels 13' to rotate counter-clockwise, as viewed in Fig. 6. The revolving wheel 8 by means of its abrading surface tears the skins off from the kernels, thus effecting the blanching operation. By passing the kernels tangentially across the upper revolving surface of the abrading wheel 8, with the kernels held by gentle pressure due to the springs 13, the kernels will be first rotated axially in one direction, and then, after passing the radial line A—B, they will be rotated axially in the opposite direction. By thus rotating each kernel in opposite directions and in contact with the abrading surface, portions of the skins which will not be torn from the kernels while they are axially rotated in one direction, will be torn from the kernels when they are rotated in the opposite direction.

After the kernels have passed from under the springs 13, they will have been blanched and will be guided by the diverging discharge ends of the bars 11 into the upper ends of two vertical funnels, 20, preferably of canvas, and which at their lower ends discharge upon the upper side of a horizontal belt 21, mounted upon and driven by a horizontal roller 22 secured to a shaft 23, rotatably mounted in bearings 24, supported by the base 2. The shaft 23 has secured to it a driving pulley 25 which may be driven by any suitable source of power.

The funnels 20 are disposed at opposite sides respectively of the line A—B, as the kernels are fed from the two hoppers 9 and containers 10 upon revolving surfaces at opposite sides of a central vertical plane which intersects the plane A—B perpendicularly in the axis of the shaft 4. As viewed in Fig. 2, the kernels which are fed from the container 10 at the left of the line A—B, pass therefrom to the right through the channels 12 against the wheel 8 and into the right hand funnel 20. The kernels which are discharged from the container 10 at the right of the line A—B, Fig. 2, pass to the left in the channels 12 against the wheel 8 and into the left funnel 20. After the kernels drop upon the belt 21, they are carried thereby to a suitable place of delivery, not shown.

To prevent the kernels flying upwardly out of the channels 12 after they pass from under the ends of the strips 14, there are provided two canvas flaps 26, the inner free edges of which are supported in an upwardly curving position by means of cords 27 attached to transverse curved slots 28, to which the upper ends of the canvas funnels 20 are respectively attached.

Opposite ends of the bars 11 are supported respectively in horizontal transverse grooved bars 29, the ends of which are attached to and supported by the casing 1.

Yokes 30 are mounted on the two sets of bars 11, respectively.

Rigidly secured to the shaft 4 above the wheel 8 is a cam 31 which bears against two plates 32, respectively secured to the two adjacent bars 11. When the cam 31 rotates, it will effect a small lateral oscillation of the two sets of bars 11 and the two containers 10, thus agitating the kernels in said containers so as to effect reliable feeding of the kernels from the containers and preventing the kernels becoming bridged or jammed therein.

My invention provides an efficient and rapid means for blanching kernels of peanuts and the like.

I do not limit my invention to the structure shown and described, as many modifications, within the scope of the appended claims, may be made without departing from the spirit of my invention.

What I claim is:—

1. In a peanut blanching machine, a member having an abrading surface, means for so moving said member that said surface will move curvilinearly, and means for guiding kernels to be blanched tangentially in contact with said abrading surface, substantially as set forth.

2. In a peanut blanching machine, a member having an abrading surface, means for revolving said member, and means for guiding kernels to be blanched tangentially in contact with said revolving abrading surface, substantially as set forth.

3. In a peanut blanching machine, a member having a flat abrading surface, means for revolving said member, and means for guiding kernels to be blanched tangentially in contact with said abrading surface, substantially as set forth.

4. In a peanut blanching machine, a member having a flat abrading surface, means for revolving said member, and means for guiding kernels to be blanched tangentially in contact with said abrading surface, while permitting the kernels to turn, substantially as set forth.

5. In a peanut blanching machine, a member having a flat abrading surface, means for revolving said member, and means for guiding kernels to be blanched tangentially in contact with and under pressure against said abrading surface, while permitting the kernels to turn, substantially as set forth.

6. In a peanut blanching machine, a rotary member having a flat abrading surface, kernel guiding means adjacent to and tangential with said surface, said guiding means being arranged to permit the kernels to turn, and means for feeding the kernels to said guiding means, substantially as set forth.

7. In a peanut blanching machine, a rotary member having a flat abrading surface, kernel guiding means adjacent to and tangential with said surface, said guiding means being arranged to permit the kernels to turn and having means for pressing the kernels against said abrading surface, and means for feeding the kernels to said guiding means, substantially as set forth.

8. In a peanut blanching machine, a rotary stone wheel having a flat surface, and means for guiding kernels to be blanched tangentially in contact with said surface, while permitting the kernels to turn, substantially as set forth.

9. In a peanut blanching machine, a rotary member having a flat abrading surface, means for guiding kernels to be blanched tangentially across said surface, a container arranged to feed the kernels to said guiding means, and means for shaking said container, substantially as set forth.

10. In a peanut blanching machine, a rotary member having an abrading surface, means for guiding kernels to be blanched in contact with and under pressure against said surface, a kernel container supported by and arranged to feed kernels to said guiding means, and means for shaking said guiding means, substantially as set forth.

11. In a peanut blanching machine, a rotary member having an abrading surface, kernel guiding means arranged to guide kernels in contact with said surface, a cam, rotatable with said member and arranged to move said guiding means laterally, and means carried by said guiding means for feeding kernels to be blanched to said guiding means, substantially as set forth.

12. In a peanut blanching machine, a rotary member having a flat abrading surface, means for guiding kernels to be blanched tangentially in contact with said surface, means for feeding kernels to said guiding means, a traveling belt, and means for carrying the blanched kernels to and depositing them upon said belt, substantially as set forth.

13. In a peanut blanching machine, a rotary member having a flat abrading surface, two guiding members disposed adjacent to and tangential with said surface, means for feeding kernels to be blanched between said guiding members, and means for yieldingly pressing the kernels passing between said guiding members against said abrading surface, substantially as set forth.

14. In a peanut blanching machine, a rotary member having a flat abrading surface, two guiding members disposed adjacent to and tangential with said surface, a flexible member between two said guiding members, means for feeding the kernels to be blanched between said guiding members, and yielding means for pressing said flexible member against said kernels passing between said guiding members, the pressure being applied in a direction such that the kernels will be pressed against the abrading surface, substantially as set forth.

15. In a peanut blanching machine, a rotary member having an abrading surface, two guiding members disposed adjacent to and parallel with said surface, means for feeding kernels to be blanched between said guiding members, a flexible member for holding the kernels passing between the guiding members against said abrading surface, and a spring for pressing said flexible member against the kernels, substantially as set forth.

16. In a peanut blanching machine, a rotary member having a flat abrading surface, two guiding means at opposite sides of the axis of said member, means for feeding kernels to be blanched to said two guiding means, said feeding means being supported by said guiding means, and a cam rotatable with the rotary member and arranged to laterally move said two guiding means, substantially as set forth.

In testimony whereof I have signed my name to this specification.

ROSCOE P. WITT.